United States Patent
Lavi et al.

(10) Patent No.: US 11,823,666 B2
(45) Date of Patent: Nov. 21, 2023

(54) AUTOMATIC MEASUREMENT OF SEMANTIC SIMILARITY OF CONVERSATIONS

(71) Applicant: International Business Machines Corporation, Armonk, NY (US)

(72) Inventors: Ofer Lavi, Tel Aviv (IL); Inbal Ronen, Haifa (IL); Ella Rabinovich, Hod Hasharon (IL); David Boaz, Bahan (IL); David Amid, Modiin (IL); Segev Shlomov, Haifa (IL); Ateret Anaby - Tavor, Givat Ada (IL)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 17/492,716

(22) Filed: Oct. 4, 2021

(65) Prior Publication Data

US 2023/0105453 A1    Apr. 6, 2023

(51) Int. Cl.
    G10L 15/00       (2013.01)
    G10L 15/18       (2013.01)
    G06F 40/35       (2020.01)
    G10L 15/10       (2006.01)

(52) U.S. Cl.
    CPC .......... *G10L 15/1815* (2013.01); *G06F 40/35* (2020.01); *G10L 15/10* (2013.01)

(58) Field of Classification Search
    None
    See application file for complete search history.

(56) References Cited

U.S. PATENT DOCUMENTS

| 10,713,432 | B2  |   | 7/2020  | Goyal    |            |
|------------|-----|---|---------|----------|------------|
| 11,094,335 | B1  | * | 8/2021  | Wang     | G10L 25/51 |
| 2003/0191627 | A1 | * | 10/2003 | Au       | G06F 40/30 |
|            |     |   |         |          | 704/9      |
| 2011/0258181 | A1 | * | 10/2011 | Brdiczka | G06F 16/355 |
|            |     |   |         |          | 707/723    |
| 2013/0158986 | A1 | * | 6/2013  | Wiles    | G06F 40/35 |
|            |     |   |         |          | 704/9      |

(Continued)

FOREIGN PATENT DOCUMENTS

| CN | 106021361 A | 10/2016 |
|----|-------------|---------|
| CN | 106776548 A | 5/2017  |

OTHER PUBLICATIONS

Svitlana Vakulenko et al., "Measuring Semantic Coherence of a Conversation"; Online at: https://arxiv.org/abs/1806.06411, Jun. 17, 2018.

(Continued)

*Primary Examiner* — Jialong He
*Assistant Examiner* — Uthej Kunamneni
(74) *Attorney, Agent, or Firm* — Dvir Gassner

(57) ABSTRACT

Automatic measurement of semantic textual similarity of conversations, by: receiving two conversation texts, each comprising a sequence of utterances; encoding each of the sequences of utterances into a corresponding sequence of semantic representations; computing a minimal edit distance between the sequences of semantic representations; and, based on the computation of the minimal edit distance, performing at least one of: quantifying a semantic similarity between the two conversation texts, and outputting an alignment of the two sequences of utterances with each other.

7 Claims, 2 Drawing Sheets

(56) References Cited

U.S. PATENT DOCUMENTS

| | | | | |
|---|---|---|---|---|
| 2013/0273976 | A1* | 10/2013 | Rao | G06F 40/30 |
| | | | | 455/563 |
| 2016/0300049 | A1* | 10/2016 | Guedalia | G06V 30/1985 |
| 2019/0347319 | A1* | 11/2019 | Goyal | G10L 15/32 |
| 2020/0168210 | A1 | 5/2020 | Seo | |
| 2020/0242134 | A1* | 7/2020 | Salhin | G06F 16/906 |
| 2020/0372117 | A1* | 11/2020 | Han | G06F 40/30 |
| 2021/0049326 | A1* | 2/2021 | Amend | G06F 40/232 |
| 2021/0067477 | A1 | 3/2021 | Tan | |

OTHER PUBLICATIONS

Yinfei Yang et al., "Learning Semantic Textual Similarity from Conversations"; Online at: https://arxiv.org/abs/1804.07754, Apr. 20, 2018.

Ana Paula Appel et al, "Combining Textual Content and Structure to Improve Dialog Similarity"; Online at: https://arxiv.org/abs/1802.07117, Feb. 20, 2018.

Chien-Sheng Wu et al, "TOD-BERT: Pre-trained Natural Language Understanding for Task-Oriented Dialogue"; Association for Computational Linguistics; Proceedings of the 2020 Conference on Empirical Methods in Natural Language Processing (EMNLP), pp. 917-929, Nov. 16-20, 2020.

Daniel Cer et al, "Universal Sentence Encoder"; Online at: https://arxiv.org/abs/1803.11175, Mar. 29, 2018.

Fan Zhang et al, "Sentence-level 431 Rewriting Detection"; In Proceedings of the Ninth Workshop on Innovative Use of NLP for Building Educational Applications, pp. 149-154, Association for Computational 435 Linguistics, Jun. 26, 2014.

Luxun Xu et al, "Clustering-Based Summarization of Transactional Chatbot Logs"; In 2019 IEEE International Conference on Humanized Computing and Communication (HCC), pp. 60-67, Sep. 25-27, 2019.

Regina Barzilay et al, "Sentence alignment for monolingual comparable corpora"; In Proceedings of the 2003 Conference on Empirical Methods in Natural Language Processing, pp. 25-32, 2003.

Reihane Boghrati et al, "Conversation level syntax similarity metric"; Behav Res 50, 1055-1073 (2018), Jul. 11, 2017.

Robert A Wagner et al, "The string-to-string correction problem"; Journal of the ACM (JACM), vol. 21 issue 1: pp. 168-173, Jan. 1, 1974.

Lavi, Ofer et al. "We've had this conversation before: A Novel Approach to Measuring Dialog Similarity" arXiv:2110.05780lvl, Oct. 12, 2021 (2021-10-12), pp. 1-9.

* cited by examiner

AUTOMATIC MEASUREMENT OF SEMANTIC SIMILARITY OF CONVERSATIONS

BACKGROUND

The invention relates to the field of natural language processing and text processing.

Measuring semantic textual similarity lies at the heart of many natural language and text processing tasks, such as sentence classification, information retrieval, and question answering.

Traditional text representation approaches, such as high dimensional and sparse feature vectors, have been boosted by the introduction of efficiently-learned embeddings, unleashing the full power of the dense semantic representation of words. Subsequently, new methods were developed for contextual representation of words, sentences, paragraphs, and documents, facilitating the assessment of semantic similarity between larger portions of text.

Still, there remains a need for additional methods of measuring semantic textual similarity. One such specific need arises in the realm of semantically comparing conversation texts. Conversations differ from most other types of documents. Traditional documents typically compound multiple sentences or paragraphs in an unstructured way, to express one or several ideas. A traditional document typically has one author (or multiple authors working in concert on all or most document parts). Conversations, on the other hand, can be regarded as semi-structured documents constructed from a sequence of utterances; they present unique characteristics, such as having an author for each utterance, and an ordered conversation flow that can be viewed as a skeleton built of dialog acts. Therefore, measuring the semantic similarity between conversations poses a unique challenge.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

Provided herein, according to some embodiments, is a computer-implemented method comprising: receiving two conversation texts, each comprising a sequence of utterances; encoding each of the sequences of utterances into a corresponding sequence of semantic representations; computing a minimal edit distance between the sequences of semantic representations; and based on the computation of the minimal edit distance, performing at least one of: (a) quantifying a semantic similarity between the two conversation texts, and (b) outputting an alignment of the two sequences of utterances with each other.

Further provided herein, according to some embodiments, is a system comprising: at least one hardware processor, and a non-transitory computer-readable storage medium having program code embodied therewith, the program code executable by said at least one hardware processor to, automatically: receive two conversation texts, each comprising a sequence of utterances; encode each of the sequences of utterances into a corresponding sequence of semantic representations; compute a minimal edit distance between the sequences of semantic representations; and based on the computation of the minimal edit distance, perform at least one of: (a) quantify a semantic similarity between the two conversation texts, and (b) output an alignment of the two sequences of utterances with each other.

Yet further provided herein, according to some embodiments, is a computer program product comprising a non-transitory computer-readable storage medium having program code embodied therewith, the program code executable by at least one hardware processor to, automatically: receive two conversation texts, each comprising a sequence of utterances; encode each of the sequences of utterances into a corresponding sequence of semantic representations; compute a minimal edit distance between the sequences of semantic representations; and based on the computation of the minimal edit distance, perform at least one of: (a) quantify a semantic similarity between the two conversation texts, and (b) output an alignment of the two sequences of utterances with each other.

In some embodiments, the computation of the minimal edit distance comprises assignment of costs to the following edit operations: deletion, insertion, and substitution.

In some embodiments, the substitution cost is based on a cosine distance between the semantic representations.

In some embodiments, the method further comprises, or the program code is further executable for: assigning an infinitely high cost of substitution between those of the semantic representations whose underlying utterances were authored by different author types.

In some embodiments, the semantic representations are semantic distributional representations.

In some embodiments, the computer-implemented method is executed by at least one hardware processor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a method, also embodied in a system and a computer program product, for automatically measuring semantic similarity between conversations.

The term 'conversation,' as referred to herein, may be used to describe a series of utterances exchanged between two or more authors (or 'users') interactively. In its simplest form, a conversation can be a dialog between two authors, but more complex conversations can take place between more than two authors. The authors can be humans, artificial intelligence (AI) software programs (sometimes termed 'chat bots' or 'virtual agents'), or a combination of both.

The semantics of a conversation, in contrast to that of a traditional document, lies in a multitude of factors, including the semantic meaning of each discrete utterance, the flow (order) of utterances along the conversation, and the identity (or type of identity, such as human or AI) of the different authors. Advantageously, the present method takes into account these unique traits.

The present method is generally based on an advantageous adaptation of 'edit distance,' the known family of metrics and algorithms used for sequence analysis, to the specific case of semantic conversation similarity.

The ability to compare conversations may be beneficial in many real-world use cases, such as conversation analytics for contact center calls, virtual agent design, and more. For example, a comparison of conversations may be used to deduce a certain consensus among a large number on conversations, for the purpose to comparing a newly-provided conversation against this consensus. As another example, in the field of customer care, by comparing human-to-human conversations with human-to-virtual agent conversations, one may discover flaws in the virtual agent programming and gain insight into how to fix these flaws.

Figure 1:
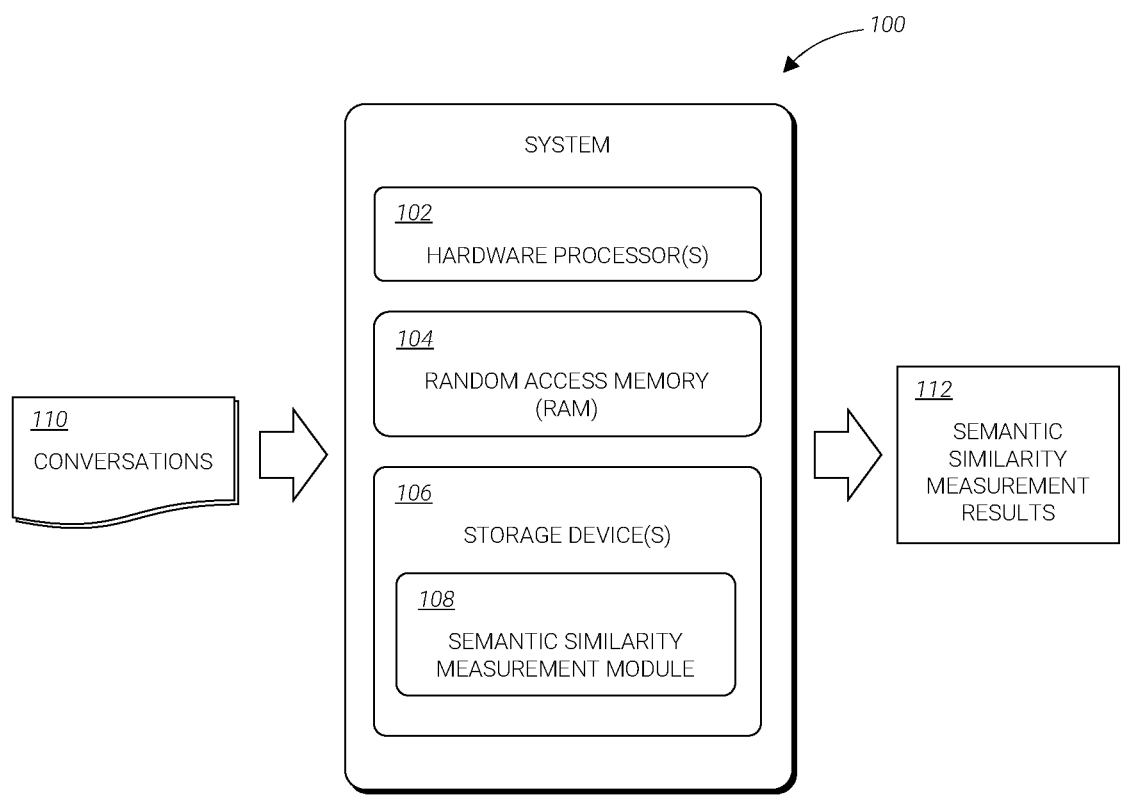
FIG. 1 is a block diagram of an exemplary system for measuring semantic similarity between conversations, according to an embodiment.

Reference is now made to FIG. 1, which shows a block diagram of an exemplary system 100 for measuring semantic similarity between conversations, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a semantic similarity measurement module 108. The software components may include an operating system having various software components and/or drivers for controlling and managing general system tasks (e.g., memory management, storage device control, power management, etc.), and facilitating communication between various hardware and software components.

System 100 may operate by loading instructions of semantic similarity measurement module 108 into RAM 104 as they are being executed by processor(s) 102. The instructions of semantic similarity measurement module 108 may cause system 100 to receive conversations 110, measure their semantic differences, and output the results 112 of this measurement.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

Figure 2:
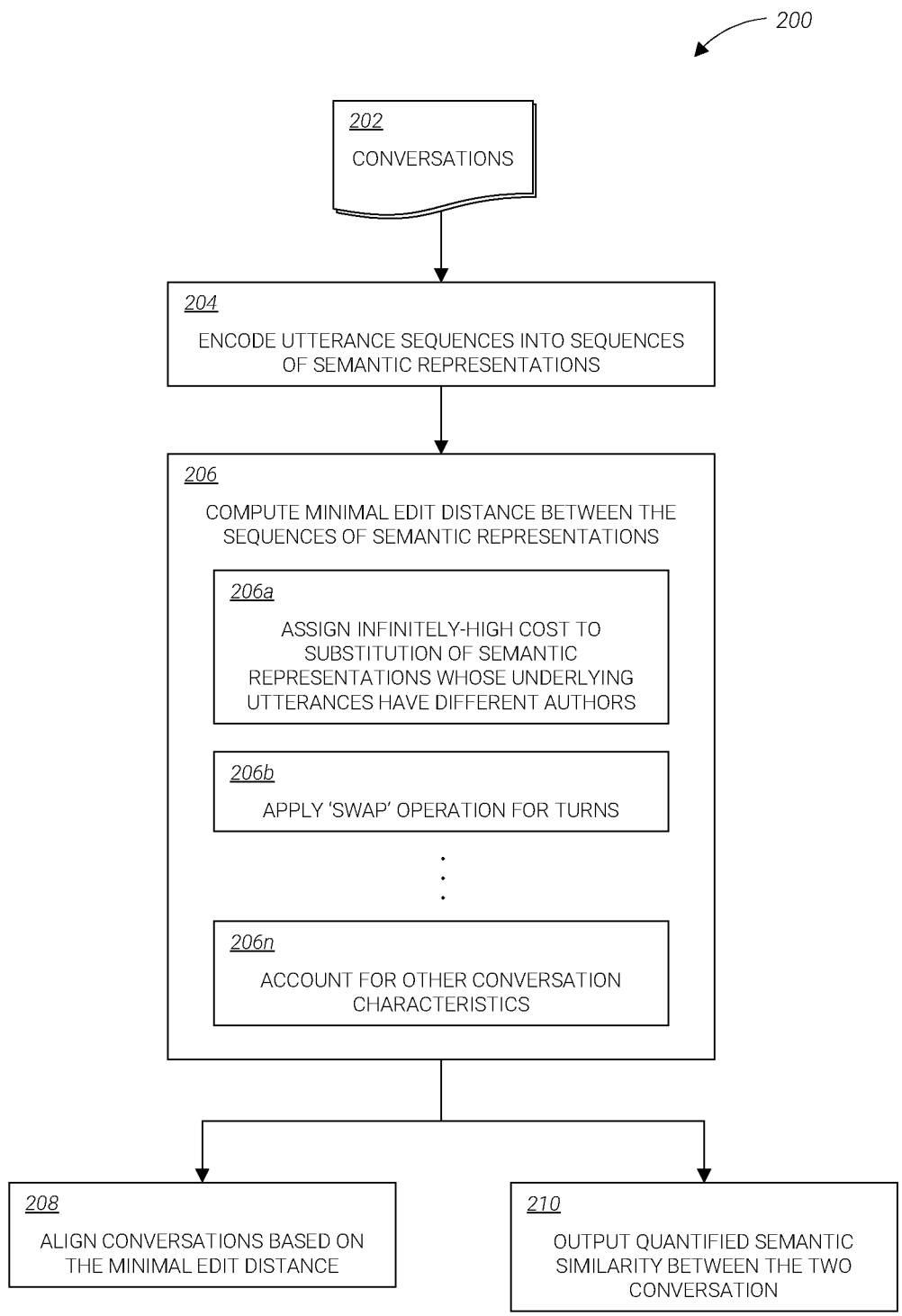
FIG. 2 is a flowchart of a method for measuring semantic similarity between conversations, according to an embodiment.

The instructions of semantic similarity measurement module 108 are now discussed with reference to the flowchart of FIG. 2, which illustrates a method 200 for measuring semantic similarity between conversations, in accordance with an embodiment.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by system 100 of FIG. 1), unless specifically stated otherwise.

Method 200, in a general sense, treats a conversation as a sequence of utterances, and uses edit distance to measure the minimal cost for a sequence of edit operations required to transform one conversation into the other. The basic edit operations (deletion, insertion, and substitution) may be used to measure a semantic distance between utterances, taking into account their authors, and defining a dynamic cost of the utterance substitution operation.

Optionally, method 200 also provides adaptations that are unique to conversations, such as specific handling of multiple subsequent utterances coming from the same author when calculating the semantic similarity cost function, as well as additional edit operations unique to conversations such as a swap operation on turns (pairs of utterances from different authors) that keeps the order within each turn.

In step 202, two conversations whose comparison is desired may be received. The conversations may be embodied as digitally-encoded texts. Formally, these two conversations may be denoted $c_1$ and $c_2$, and may be of lengths m and n, respectively. The two conversations may each include a sequence of utterances denoted $u_1^1, \ldots, u_1^m$ and $u_2^1, \ldots, u_2^n$, respectively. Typically, each utterance is a sentence including multiple words in natural language. However, it is possible for one or more utterances in a conversation to be a single word (e.g., "fine") or even one or a few symbols (e.g., a question mark, a double question mark, etc.).

The authors of these utterances may be denoted $a_1^1, \ldots, a_1^m$ for the first conversation and $a_2^1, \ldots, a_2^n$ for the second conversation. The term 'author,' as used herein, may refer either to a unique identifier of the author (such as a full name, a unique identification number, etc.), or, more typically, to a type of author. The type of the author may be, for example, a human customer, a human customer service agent (hereinafter 'human agent'), a virtual customer service agent (hereinafter 'virtual agent'), or any other descriptor of the type, role, affiliation, etc. of each of the authors. Knowing the type of author of the utterances in each conversation may contribute to the comparison between the conversations, by differentiating between otherwise identical or similar utterances which were nonetheless authored by completely different author types.

To simplify the following discussions, two exemplary author types are assumed: a customer and an agent. Namely, each of the first and second conversations may be a conversation between a customer and an agent (not necessarily the same ones in both conversations, of course).

In step 204, each of the utterance sequences, that of the first conversation and that of the second conversation, may be encoded into a sequence of semantic representations, such that each utterance ($u_1^i$ and $u_2^j$ of the first and second conversations, respectively) has its own semantic representation (denoted $e_1^i$ and $e_2^j$, respectively).

The term 'semantic representation' expresses any type of numerical representation that encodes the supposed meaning of the pertinent utterance. For instance, each such semantic representation may be a vector of numbers, in what is known as a 'semantic distributional representation.'

The encoding of step 204 may be performed by any conventional algorithm for semantic encoding of texts. One example of a suitable algorithm is the Universal Sentence Encoder (Daniel Cer et al., "Universal Sentence Encoder," arXiv:1803.11175v2 [cs.CL], 2018), now available as part of the TensorFlow open-source software library for machine learning and artificial intelligence (see online at www.tensorflow.org, last accessed Sep. 27, 2021); however, other suitable algorithms for semantic encoding of texts may become apparent to those of skill in the art.

In step 206, a minimal edit distance between the sequences of semantic representations may be computed. An edit distance, as briefly mentioned above, is the known family of metrics and algorithms used for sequence analysis—and particularly for measuring (quantifying) the similarity between two sequences. A typical edit distance algorithm measures the minimal number of insertions, deletions, and substitutions required to transform one sequence into another. Sequences are typically drawn from the same finite set of distinct symbols, e.g., the alphabet letters for strings, the set of rational numbers, the set of real numbers, etc. Given sequences a and b of lengths m and n, the distance $d_{ij}$ between two arbitrary sequence prefixes—of length i and j, respectively—is defined recursively by:

$$d_{i,0} = \sum_{k=1}^{i} w_{del}(a_k), \quad d_{0,j} = \sum_{k=1}^{j} w_{ins}(b_k) \quad (1a)$$

$$d_{i,j} = \min \begin{cases} d_{i-1,j} + w_{del}(a_i) \\ d_{i,j-1} + w_{ins}(b_j) \\ d_{i-1,j-1} + w_{sub}(a_i, b_j) \end{cases} \quad (1b)$$

for $i \in [1, m]$, $j \in [1, n]$, where $w_{del}$, $w_{ins}$ and $w_{sub}$ are deletion, insertion, and substitution weights (also termed 'costs'), respectively; these vary according to the precise application. The edit distance between two sequences may then be computed using dynamic programming, for example (see Robert A Wagner and Michael J Fischer, "The String-to-String Correction Problem," Journal of the ACM, 21(1):168-178, 1974). The chain of steps needed to convert one sequence into another constitutes the sequence alignment, where each element in the first sequence is paired with an element or a gap in the second one.

The computation of the minimal edit distance between the sequences of semantic representations in step 206 may be guided by the intuition that the alignment (deletion/insertion/substitution) of every two utterances from the different conversations—$u_1^i$ and $u_2^j$—should be driven by their semantic similarity; accordingly, in this computation, the substitution cost of the two may be defined as a function of their distance in a semantic space. Namely, given a pair of distributional representations $e_1^i$ and $e_2^j$, their substitution cost ($w_{sub}(u_1^i, u_2^j)$) may be defined based on their cosine distance. As a specific example, that substitution cost may be defined as the cosine distance of the representations, scaled by a factor $\alpha$:

$$w_{sub}(u_1^i, u_2^j) = \alpha \times (1 - \cos(e_1^i, e_2^j)). \quad (2)$$

The scaling factor $\alpha$ may be set to a value which prevents the following unwanted situation: Recall that for semantic representations, $\cos(e_1^i, e_2^j)$ (and, therefore, also $1 - \cos(e_1^i, e_2^j)$) yield values between 0 and 1. Considering just the raw cosine distance (by treating $\alpha$ as 1) as the substitution cost in Eq. 2 will result in a situation where substitution of two utterances is always 'cheaper' than insertion or deletion (operations whose cost is statically set to 1, for example), even in cases where no semantic similarity whatsoever exists between the two utterances.

Accordingly, $\alpha$ should be given a value which yields a plausible alignment between conversations, considering the semantic similarity between their utterances. Optionally, $\alpha$ may have a value in the range of 1-5, or more specifically any integer or fractional value within that range (e.g., 1.5, 2, 4.1, etc.), or any narrower range encompassed within that broader range (e.g., 1.0-1.9, 2.1-3.0, 1.0-4.0, etc.). Optionally, a suitable value for a may be determined on a case-by-case basis by performing a greedy search over possible values in the 1-5 range, for example with increments of 0.1. With reference to the Experimental Results section below, the suitable value may be considered as the one that maximizes the correlation of convED with structED on a set of 100 conversations. The values of 2.2 and 2.7 were assigned to $\alpha$ for SGD and MSDialog datasets, respectively. Those of skill in the art will therefore readily recognize how to calculate a suitable $\alpha$ for any dataset of conversations on which method 200 is to be applied.

As to the insertion and deletion operations, these may be assigned with the same static cost, set to a value falling within the range of possible substitution costs. For example, if the range of possible substitution costs is defined as the interval [0,2], then the cost of an insertion or deletion operation may be set to 1. This will drive a preference for deletions or insertions over substitutions in some cases, and a preference for substitution over deletion or insertion in other cases.

In an optional sub-step 206a, performed in case it is also desired for the author type to be factored in the comparison between the conversations, the following may be included in the minimal edit distance computation: every pair of semantic representations ($e_1^i$ and $e_2^j$) whose underlying utterances were authored by different author types may be assigned an infinitely high substitution cost. Eq. 2 may be therefore redefined as follows:

$$w_{sub}(u_1^i, u_2^j) = \begin{cases} \alpha \times (1 - \cos(e_1^i, e_2^j)) & \text{if } a_1^i == a_2^j \\ \infty & \text{otherwise} \end{cases} \quad (3)$$

For example, if both $a_1^i$ and $a_2^j$ are a 'customer', the cost of substitution of their respective semantic representations $e_1^i$, $e_2^j$ will be calculated based on their cosine distance, as discussed above. However, if $a_1^i$ is a 'customer' but $a_2^j$ is an 'agent,' the cost of substitution of $e_1^i$, $e_2^j$ will be defined as infinity, thereby indicating that they are completely different even if, theoretically, they are semantically (or even textually) identical (e.g., a customer uttering "thank you" versus an agent uttering "thank you").

An optional sub-step 206b may be performed in case it is also desired for turns to be factored in the comparison between the conversations. The term 'turn,' as referred to herein, may be used to describe two or more utterances (in the same conversation) that together express a question and an answer to that question. In its simplest form, a turn may include an utterance posing a question, and a subsequent utterance (by another author, of course) which answers that question. For example, a customer uttering "do you have IBM servers in stock?" and an agent uttering "yes, we do" in response. Of course, if in a different conversation these same utterances are authored by the opposite authors (the agent uttering the question and the customer answering it) this should be regarded as a different turn, which is not equivalent to the previous one; the order of authors matters.

More complex types of turns may include, for example, a question that is broken into multiple utterances by one author, and/or an answer that is similarly broken into multiple utterances by another author.

To factor in the existence of turns in the compared conversations, therefore, sub-step 206b may introduce an additional operation, termed here 'swap,' into the edit distance computation. This swap operation may be similar to a substitute operation, except that an entire turn (the multiple utterances which make up this turn) is substituted and not just an individual utterance. To this end, turns may first need to be detected (prior to the computation of step 206), for example by a suitable NLP-based algorithm. Next, to allow for the computation of the minimal edit distance, the swap operation may be assigned a cost based on the distance between the sematic representations of a pair of turns—one turn from the first conversation and the other turn from the second conversation. Optionally, this may be a cosine distance between the two, optionally scaled by a certain factor—as discussed above with reference to the substitute operation.

Similar to optional sub-steps 206a and 206b, one or more other sub-steps 206n may be included in the computation of step 206 in order to account for other characteristics of typical conversations. Examples of such characteristics include niceties (greetings, thanks, etc.) that are exchanged during a conversation, metadata that is provided in or with the conversation texts (e.g., tagging of utterances with 'acts' expressed in them, timestamps of utterances, etc.), and more. Such sub-steps 206n may include, for instance, one or more additional operations defined for the edit distance computation, one or more costs (constant or dynamic) assigned to these operations or any of the basic three operations, etc.

For example, to account for utterances that are merely niceties and lack any real relevance to the topic of the conversation, an optional sub-step may include the identification of these utterances (e.g., by some suitable NLP-based algorithm) and the assignment of a suitable addition, insertion, and/or substitution cost to them in order to effectively disregard their existence in any of the compared conversations. Alternatively, a simpler (but likely less accurate) technique to account for niceties (or other texts which are irrelevant to the conversation's topic) may be to naively assume that the first few utterances and/or the last few utterances in a conversation are likely to be niceties, and assign a suitable cost to any operations involving them. This will diminish the effect that differently-phrased niceties in the two compared conversation may have had on the semantic similarity which method 200 measures. A more advanced version of this technique may be to gradually alter the cost over the first few and/or last few utterances in a conversation, under the assumption that utterances relevant to the conversation's topic are more likely to exist as the middle of the conversation is approached.

As another example, 'act' tagging of certain utterances (see the Experimental Results section below for further details) may be utilized to reduce the substitution cost of utterances tagged with the same act type, thereby partially or fully overriding the substitution cost otherwise assigned to these utterances based on their semantic representations alone. 'Act' tags for the conversations compared by method 200 may either be provided (in step 202) alongside the conversations as metadata, or be inferred from the conversations automatically by a suitable machine learning algorithm, such as an NLP-based dialog act classifier.

Next, one or both of steps 208 and 210 may be executed (to output the results block 112 of FIG. 1), as desired by a user of method 200:

In a step 208, an alignment of the two sequences of utterances may be output, to aid a user of method 200 to visually comprehend the similarity (and hence, the differences) between the two conversations. The alignment itself may be a byproduct of the edit distance computation of step 206—deletion and insertion may yield non-aligned utterances, while substitution may yield aligned utterances.

Reference is now made to Table 1, which presents two exemplary conversations between a customer and an agent, whose utterance sequences are aligned with each other based on an invocation of steps 202-208.

TABLE 1

Alignment of two exemplary conversations

|    | Conversation 1 | Conversation 2 |
|----|----------------|----------------|
| 1  | Customer: I'd like to buy a car from a dealership in my area. I like sportscars. | Customer: I'd like to search for car dealerships. I want to get a new car. |
| 2  | Agent: Where do you live? | Agent: Where are you located? |
| 3  | Customer: Could you look for dealerships in San Fernando? | Customer: Could you locate dealerships in Santa Monica for me? |
| 4  | Agent: I found a Toyota dealership there. Would you like more details? | Agent: What do you think about Chevrolet and BMW? |
| 5  |  | Customer: Please look for other dealerships. I would like something in the south of the city. |
| 6  |  | Agent: How about Mercedes, Tesla, or Lexus? |
| 7  | Customer: I'd love a Chevrolet, actually. When can I go test-drive one? | Customer: Lexus is the one for me. When can I go test drive it? Is today possible? |
| 8  | Agent: What time would you like to schedule this for? |  |
| 9  | Customer: I'd like to go on Wednesday. |  |
| 10 | Agent: I discovered an open slot for test-driving at the Fast Cars dealership in San Fernando at 9 am. | Agent: I discovered an open slot for test-driving at the Lexus City dealership in Santa Monica at 2 pm today. |
| 11 | Customer: That sounds great. Thanks! | Customer: That sounds just perfect. Much appreciated. |
| 12 | Agent: Have a pleasant day. | Agent: Have a pleasant day. |

The alignment of step 208 may include a computation of how to present the two conversations in a way which visually indicates correspondence between the semantics of their utterance sequences. Tabular format is one way to present such correspondence, as Table 1 demonstrates, but any other visual presentation of the alignment is also intended herein, of course.

As seen in Table 1, empty cells indicate the operations of insertion and deletion, while full rows (having values for both Conversation 1 and Conversation 2) indicate utterances that are subject to substitution at some (non-infinite) cost. For example, row no. 5 indicates an insertion of a certain customer utterance from Conversation 2 into Conversation 1 (which may also be viewed in the reverse, as a deletion of that utterance from Conversation 1), while row no. 1 indicates utterances with some measurable semantic similarity. Also, notably, the agent utterance in row no. 4 of Conversation 2 is not aligned with the customer utterance in row no. 7 of Conversation 1 despite their apparent semantic similarity (both mentioning a Chevrolet), due to the invocation of sub-step 206a which assigned their substitution an infinitely high cost.

In step 210, a quantified semantic similarity between the two conversation texts may be output, based on the minimal edit distance computed in step 206 (with or without the optional sub-step 206*a*). The quantified semantic similarity may be on any desired scale, such the intervals [0,1] or [0,100]; that scale may denote anywhere between no semantic similarity whatsoever, up to identical semantic similarity between the two conversations. Merely as an illustrative example, the quantified similarity of the two conversations shown in Table 1 may be, for example, 0.5, taking into account the semantics, flow (order), and authors of their utterances.

Experimental Results

The disclosed method for measuring semantic similarity between conversations (abbreviated here 'convED' for simplicity) has been evaluated using two distinct approaches: intrinsic evaluation, assessing the ability of the method to capture conversation flow, and external human evaluation via crowd-sourced annotations. Also, the method has been compared to two competitive baselines commonly used for estimating text similarity.

Two conversation datasets were used for the evaluation: SGD (Abhinav Rastogi et al., "Towards Scalable Multi-Domain Conversational Agents: The Schema-Guided Dialogue Dataset," Proceedings of the AAAI Conference on Artificial Intelligence, 34(05), 8689-8696, April 2020) and MSDialog (Chen Qu et al., "Analyzing and Characterizing User Intent in Information-seeking Conversations," SIGIR '18: The 41$^{st}$ International ACM SIGIR Conference on Research & Development in Information Retrieval, Pages 989-992, June 2018).

SGD is a large corpus of task-oriented dialogs that follow pre-defined dialog skeletons. MSDialog is a real-world dialog dataset of question answering interactions collected from a forum for Microsoft products, where a subset of dialogs (over 2K) was labeled with metadata.

The two competitive baselines selected for the evaluation were: (1) the aforementioned Universal Sentence Encoder, a common choice for generating sentence-level embeddings, where a document embedding is computed by averaging its individual sentence representations; and (2) doc2vec (Quoc Le et al., "Distributed Representations of Sentences and Documents," Proceedings of the 31$^{st}$ International Conference on Machine Learning, PMLR 32(2):1188-1196, June 2014), an embedding algorithm that generates a distributional representation of documents, regardless of their length. The latter has been shown to outperform other document embedding approaches (see, for example, Jey Han Lau et al., "An Empirical Evaluation of doc2vec with Practical Insights into Document Embedding Generation," Proceedings of the 1st Workshop on Representation Learning for NLP, Pages 78-86, August 2016; and Jingyuan Zhang et al., "Evaluating the Utility of Document Embedding Vector Difference for Relation Learning," arXiv:1907.08184 [cs.CL], July 2019).

After encoding/embedding the dialogs using these two baseline algorithms, the distance between two dialogs (abbreviated here 'avgSemDist' for Universal Sentence Encoder, and d2vDise for doc2vec) was computed by the cosine similarity between their encoded/embedded representations.

Both SGD and a subset of MSDialog are annotated with rich metadata, including acts and slot names (SGD), and intent type, the equivalent of acts (MSDialog). For example, the agent utterance "When would you like to check in?" in the SGD corpus is labeled with an act of type REQUEST and a slot value of type check_in_date. Consequently, a dialog structure for the flow of actions and corresponding slot values can be extracted using this metadata. While faithfully representing a dialog flow, this structural pattern does not reflect the precise semantics of utterances underlying the acts—a setup that offers a natural test-bed for evaluation of the semantic similarity measure disclosed here, compared to other methods. Specifically, given a dialog, its action flow may be defined as the temporal sequence of its dialog acts or intents, concatenated with alphabetically sorted-slots, where they exist. As a concrete example, the utterance in row no. 2 of Conversation 1 in Table 1 would be represented as REQUEST_location. For a dialog $c_i$, the sequence of its dialog acts and slots may be denoted by $da_i$. Note that within a certain domain, the set of possible dialog acts and slots spans a fixed set. Therefore, the traditional edit distance metric can be applied to assess the distance between the dialog act flows of two dialogs. The dialog structural edit distance (abbreviated here 'structED') between dialogs $c_i$ and $c_j$ is then computed as the edit distance between the two sequences $da_i$ and $da_j$.

Prior to the evaluation, it was hypothesized that the pairwise conversation distance represented by convED (the present method) will exhibit higher proximity to structED than the distance (avgSemDist, d2vDist) computed by either of the baseline algorithms. This hypothesis was tested by calculating the four metrics (avgSemDist, d2vDist, structED, and convED) on all distinct conversation pairs ($c_i$, $c_j$), i≠j, in a conversation set $\mathcal{C}$. Pearson's correlation was then computed between each of {convED, avgSemDist, d2vDist} and structED. Since structED carries over only little semantics, the highest correlation will be indicative of the metric that most faithfully captures the inter-dialog structural similarity.

The evaluation was performed on a subset of SGD dialogs in the domain of Events due to their diverse nature, and on the entire set of MSDialog conversations. 100 subsets of 200 conversations were randomly sampled, and averaged over individual sample correlations. Table 2 summarizes the results.

TABLE 2

Mean Pearson's correlation between structED and the pairwise dialog distance computed using each metric.

| Dataset | SGD (Events) | MSDialog |
|---|---|---|
| No. of dialogs | 871 | 35,000 |
| avgSemDist | 0.265 | 0.031 |
| d2vDist | 0.097 | 0.112 |
| convED | 0.540 | 0.301 |

Evidently, convED outperforms the other baselines, exhibiting a higher mean correlation to structED, of 0.540 on the SGD (Events) dataset, and 0.301 on the MSDialog dataset (t-test, p<0.001).

The convED measure was further evaluated by comparing it to the human perception of dialog similarity. It was hypothesized that convED is likely to exhibit a higher agreement with human judgement, compared with the more competitive baseline avgSemDist (on the SGD data).

Rating the precise degree of similarity between two dialogs is an extremely challenging task due to the subjective nature of the relative perception of conversation similarity. Rather than directly estimating a similarity value through scale-based annotation, the annotation task was cast as a two-way comparison scenario. Five high-quality annotators were presented with a conversation triplet: one anchor and two candidate conversations. They provided judgements for a sample of 500 triplets. However, the crowd-sourced evaluation was then limited to a subset of annotation examples with at least 80% (4 out of 5) inter-annotator agreement; this resulted in 229 samples out of 500. Treating these high-confidence judgements as the ground truth, the ratio of triplets that agree with human intuition was computed for each of the two methods: convED and avgSemDist. The evaluation yielded 73.3% and 26.7% agreement with human judgements, respectively. This corroborated the hypothesis that convED better captures human perception of dialog similarity.

All the techniques, parameters, data types, and other characteristics described above with respect to the experimental results are optional embodiments of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
receiving two conversation texts, each comprising a sequence of utterances;
encoding each of the sequences of utterances, using a machine learning algorithm for semantic encoding of texts, into a corresponding sequence of semantic representations;
computing a minimal edit distance between the sequences of semantic representations, wherein the computing comprises:
assignment of costs to the following edit operations: deletion, insertion, and substitution, wherein the cost of substitution is based on a cosine distance between the semantic representations, and
assigning an infinitely high cost of substitution between those of the semantic representations whose underlying utterances were authored by different author types; and
based on the computation of the minimal edit distance, performing at least one of:
quantifying a semantic similarity between the two conversation texts, and
outputting an alignment of the two sequences of utterances with each other.

2. The computer-implemented method of claim 1, wherein the semantic representations are semantic distributional representations.

3. The computer-implemented method of claim 1, executed by at least one hardware processor.

4. A system comprising:
(a) at least one hardware processor; and
(b) a non-transitory computer-readable storage medium having program code embodied therewith, the program code executable by said at least one hardware processor to, automatically:
receive two conversation texts, each comprising a sequence of utterances,
encode each of the sequences of utterances, using a machine learning algorithm for semantic encoding of texts, into a corresponding sequence of semantic representations,
compute a minimal edit distance between the sequences of semantic representations, wherein the computing comprises:
assignment of costs to the following edit operations: deletion, insertion, and substitution, wherein the cost of substitution is based on a cosine distance between the semantic presentations, and
assigning an infinitely high cost of substitution between those of the semantic representations whose underlying utterances were authored by different author types, and
based on the computation of the minimal edit distance, perform at least one of:
quantify a semantic similarity between the two conversation texts, and
output an alignment of the two sequences of utterances with each other.

5. The system of claim 4, wherein the semantic representations are semantic distributional representations.

6. A computer program product comprising a non-transitory computer-readable storage medium having program code embodied therewith, the program code executable by at least one hardware processor to, automatically:
receiving two conversation texts, each comprising a sequence of utterances;
encoding each of the sequences of utterances, using a machine learning algorithm for semantic encoding of texts, into a corresponding sequence of semantic representations;
computing a minimal edit distance between the sequences of semantic representations, wherein the computing comprises:
assignment of costs to the following edit operations: deletion, insertion, and substitution, wherein the cost of substitution is based on a cosine distance between the semantic representations, and assigning an infinitely high cost of substitution between those of the semantic representations whose underlying utterances were authored by different author types; and based on the computation of the minimal edit distance, performing at least one of:
  quantifying a semantic similarity between the two conversation texts, and
  outputting an alignment of the two sequences of utterances with each other.

7. The computer program product of claim 6, wherein the semantic representations are semantic distributional representations.

* * * * *